(12) United States Patent
Hasbun Pacheco et al.

(10) Patent No.: US 10,157,090 B2
(45) Date of Patent: *Dec. 18, 2018

(54) LIFESPAN FORECAST FOR STORAGE MEDIA DEVICES

(71) Applicant: International Business Machines Corporation, Armonk, NY (US)

(72) Inventors: Maria Esmeralda Hasbun Pacheco, Palmares (CR); Blanca R. Navarro Piedra, Heredia (CR); Jose D. Ramos Chaves, Heredia (CR); Jose P. Rosales Villegas, San Jose (CR)

(73) Assignee: International Business Machines Corporation, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/584,665

(22) Filed: May 2, 2017

(65) Prior Publication Data

US 2018/0121299 A1     May 3, 2018

Related U.S. Application Data

(63) Continuation of application No. 15/336,954, filed on Oct. 28, 2016, now Pat. No. 9,678,817.

(51) Int. Cl.
    *G06F 11/07*      (2006.01)
    *G06F 11/00*      (2006.01)

(52) U.S. Cl.
    CPC ........ *G06F 11/0727* (2013.01); *G06F 11/008* (2013.01); *G06F 11/0751* (2013.01)

(58) Field of Classification Search
    CPC .. G06F 11/004; G06F 11/008; G06F 11/0727; G11B 27/36
    See application file for complete search history.

(56) References Cited

U.S. PATENT DOCUMENTS

| 8,316,263 B1 | 11/2012 | Gough et al. |
| 9,141,457 B1 | 9/2015 | Ma et al. |
| 2015/0046635 A1 | 2/2015 | Fitzpatrick et al. |

(Continued)

FOREIGN PATENT DOCUMENTS

CN      104376875 A      2/2015

OTHER PUBLICATIONS

Pinheiro, Weber, and Barroso, Failure Trends in a Large Disk Drive Population, Feb. 2007, Mountain View CA; URL: http://thedatarecoveryblog.com/2015/05/19/mtbf-hard-drive-failure-prediction/ 13 pages.

(Continued)

*Primary Examiner* — Joseph R Kudirka
(74) *Attorney, Agent, or Firm* — George R. McGuire; Bond Schoeneck & King, PLLC; John Pivnichny

(57) ABSTRACT

A method for improving a global lifespan of a storage system of a computing system is provided. The method includes: automatically determining a lifespan value of the at least one storage device to assign a global lifespan of the storage system, the global lifespan being dependent on the installation time of the at least one storage device; replacing, responsive to a time-based failure event, a storage device of the at least one storage device; and subsequently modifying, using the computing system, the global lifespan of the storage system based on the time-based failure event to define, at least in part, an optimized lifespan of the storage system.

20 Claims, 4 Drawing Sheets

(56) References Cited

U.S. PATENT DOCUMENTS

2015/0074467 A1    3/2015  Jacoby
2015/0205657 A1    7/2015  Clark

OTHER PUBLICATIONS

Duits, MTBF: Hard drive failure prediction?, May 19, 2015, Data Recovery Blog by Kroll Ontrak, 8 pages.
Wiltshire, Mean Time Between Failures: Can It Help Predict Hard Drive Failure?, May 19, 2015, Data Blog by Kroll Ontrack, URL: http://blog.krollontrack.co.uk/concepts-explained/mean-time-between-failures-canit-help-predict-hard-drive-failure/ 6 pages.

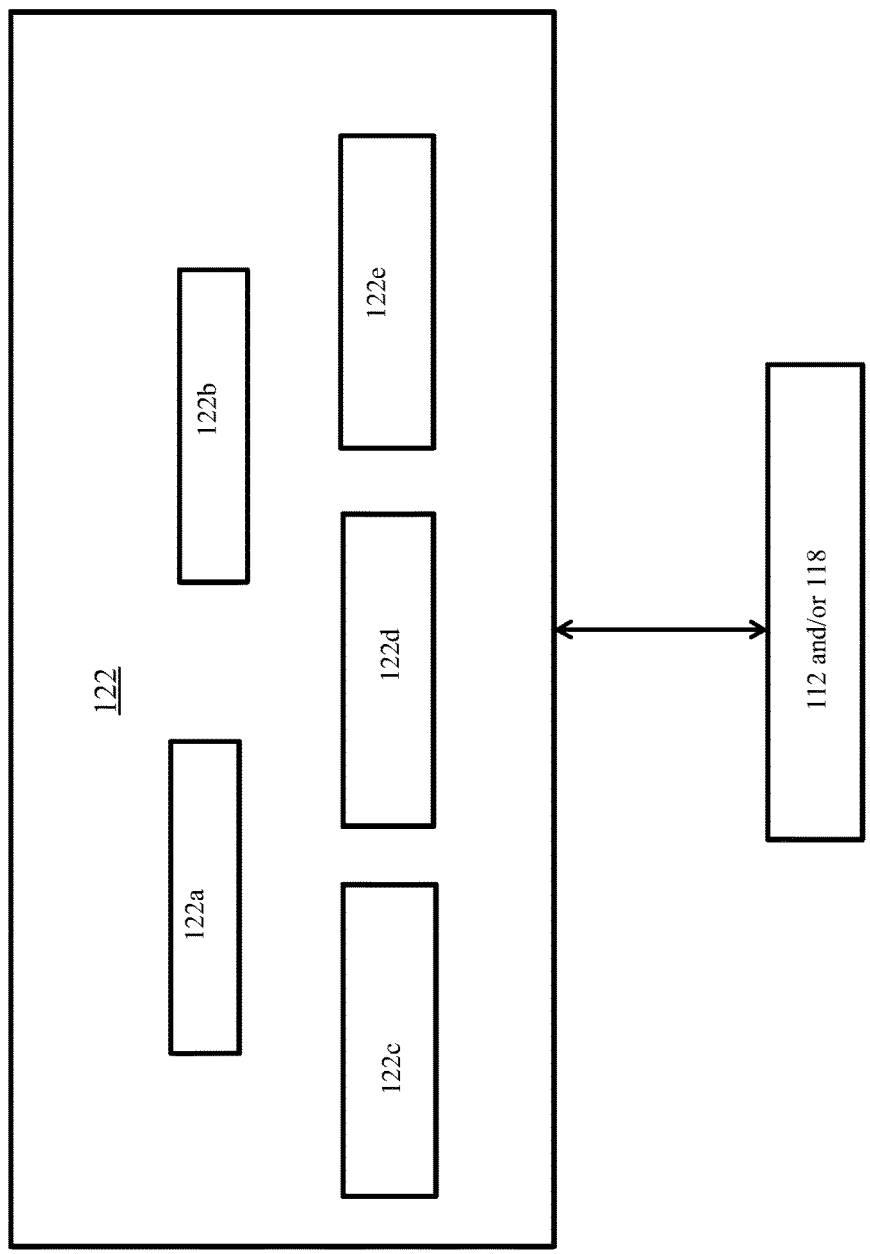

LIFESPAN FORECAST FOR STORAGE MEDIA DEVICES

CROSS-REFERENCE TO RELATED APPLICATIONS

This application is a continuation of and claims priority to co-pending U.S. patent application Ser. No. 15/336,954, filed Oct. 28, 2016, and now allowed, entitled "Lifespan forecast for Storage media Devices," the entire contents of which are incorporated herein by reference in its entirety.

BACKGROUND

The present invention relates in general to data storage technology, and more particularly, to a method for improving life estimation mechanism of a storage system of a computing system based on statistical modeling of failure data of storage device(s).

As understood, a storage system typically includes one or more storage devices that store data as segregated blocks of storage on various storage media, such as, magnetic, optical data storage disks or server hard disk devices. For instance, in magnetic disk storage systems, a storage device, such as, hard disk drive (HDD), includes one or more hard disks and an HDD controller to manage local operations concerning the disks. Advances in data storage landscapes have also led to solid-state storage devices (SSDs), such as, flash memory devices, and server hard disk devices. Disadvantageously, these storage devices are often affected by environmental factors, such as, humidity, temperature, dust, debris and handling, that are specific at which the storage devices reside which, in one example, could impact lifespan of such storage devices. Predicting impeding failure of storage media helps protect against catastrophic data loss, for example, by suggesting a back-up of data and/or replace of the storage media.

Accordingly, there is a continuing need in the art for better storage life estimation to account for failure and durability of such storage devices.

SUMMARY

In one aspect of the present application, a method for improving a global lifespan of a storage system of a computing system is provided. The method includes: automatically determining a lifespan value of the at least one storage device to assign a global lifespan of the storage system, the global lifespan being dependent on the installation time of the at least one storage device; replacing, responsive to a time-based failure event, a storage device of the at least one storage device; and subsequently modifying, using the computing system, the global lifespan of the storage system based on the time-based failure event to define, at least in part, an optimized lifespan of the storage system.

According to an embodiment, the system is configured with a pre-defined algorithm, and the automatically determining includes determining lifespan values of each storage device of the at least one storage device from the installation time thereof, and averaging the multiple lifespan values to obtain a global lifespan value of the at least one storage device, the global lifespan value being assigned to the pre-defined algorithm of the system to define the global lifespan of the storage system.

According to an embodiment, the replacing of the storage device of the at least one storage device provides a custom-global lifespan value of the at least one storage device comprising the replaced storage device, the custom-global lifespan value being calculated using the pre-defined algorithm of the system.

According to an embodiment, the custom-global lifespan value ($F_a$) of the storage system is calculated using the pre-defined algorithm $$F_a = G_a \pm \left\lfloor F_d\left(\frac{X_n}{X_t}\right)\right\rfloor$$

wherein $G_a$ is the global lifespan value of the storage system, $F_d$ is days between the installation time and the failure event, $X_n$ is a number of the at least one storage device failed during the failure event, and $X_t$ is the total amount of the at least one storage devices of the storage system.

According to an embodiment, the method further includes an additional time-based failure event, wherein the replacing the replaced storage device of the at least one storage device, responsive to the additional time-based failure event, the replacing of the replaced storage device providing an additional custom-global lifespan value of the at least one storage device comprising an additional replaced storage device.

According to an embodiment, the additional custom-global lifespan value ($F_{a1}$) of the storage system is calculated using the pre-defined algorithm $$F_{a1} = F_a \pm \left\lfloor F_d\left(\frac{X_n}{X_t}\right)\right\rfloor$$

wherein $F_a$ is the custom-global lifespan value of the storage system, $F_d$ is days between the installation time and the failure event, $X_n$ is a number of the at least one storage device failed during the failure event, and $X_t$ is the total amount of the at least one storage devices of the storage system.

According to an embodiment, the method further comprises storing discretely, at a lifespan database, each of the global lifespan value, the custom-global lifespan value and the additional custom-global lifespan value of the at least one storage device, wherein the lifespan database facilitates predicting an impeding failure event of the storage system.

According to an embodiment, the method further comprises dynamically monitoring each of the storage device, the replaced storage device and the additional replaced storage device of the at least one storage device discretely to predict the impeding failure event of the storage system.

According to an embodiment, the dynamically monitoring of each of the storage device, the replaced storage device and the additional replaced storage device provides serialized and parallelized processing steps to define the optimized lifespan of the storage system.

According to an embodiment, the method further comprises subtracting the custom-global lifespan value from the global lifespan value stored in the lifespan database to predict the impeding failure event of the replaced storage device of the at least one storage device so as to define the optimized lifespan of the storage system.

According to an embodiment, the method further comprises subtracting the additional custom-global lifespan value from the global lifespan value stored in the lifespan database to predict the impeding failure event of the additional replaced storage device of the at least one storage device so as to define the optimized lifespan of the storage system.

According to another aspect of the present application, a computer program product for improving a global lifespan of a storage system comprising at least one storage device is provided. The computer program product includes a computer readable storage medium having program instructions embodied therewith, the program instructions readable by a processor to cause the processor to perform a method comprising the steps of: automatically determining a lifespan value of the at least storage device to assign a global lifespan of the storage system, the global lifespan being dependent on the installation time of the at least one storage device; and modifying, after one or more of the at least one storage devices is replaced following a time-based failure event, the global lifespan of the storage system based on the time-based failure event to define, at least in part, an optimized lifespan of the storage system.

According to yet another aspect of the present application, a system for improving a global lifespan of a storage system of a computing system is provided. The system includes: at least one storage device; and a processor in communication with the at least one storage device, wherein the processor is configured to: (i) automatically determine a lifespan value of the at least one storage device to assign a global lifespan of the storage system, the global lifespan being dependent on the installation time of the at least one storage device; (ii) modifying, after one or more of the at least one storage devices is replaced following a time-based failure event, the global lifespan of the storage system based on the time-based failure event to define, at least in part, an optimized lifespan of the storage system.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 1A-1B depict schematic representation of a system for improving a global lifespan of a storage system of a computing system using a prediction engine associated with the storage system, in accordance with an aspect of the present invention.

DETAILED DESCRIPTION

The present disclosure is directed to, inter alia, embodiments of a method and a system for predicting an optimized global lifespan of a storage system, for instance, having one or more storage devices, of a computing system. By way of example, the present invention relates to, for instance, to improving a global lifespan of the storage system by predicting future failure events of the storage device(s) based on statistical modeling of the past failure events of storage device(s). As understood, storage system typically includes one or more storage devices that are utilized for storing data on various storage disks or storage media, such as, magnetic, optical data storage disks or server hard disk devices. As one skilled in the art will understand, each of the storage devices of the storage system may, for instance, have a global lifespan that is based on benchmark values and technical specification provided by the vendor (for instance, providing the storage system). Disadvantageously, such global lifespan may not be optimal, for instance, owing to environmental factors related to the locations at which the storage devices reside, and/or issues, such as, handling of the storage devices. In one embodiment of the present invention, an optimized lifespan of the storage system is customized to an environment of a customer's site in which the storage system is located, without being affected by the environmental variables, such as, humidity, temperature, dust, and the like, related to that specific customer site. Advantageously, such optimized lifespan of the storage system reduces the costs related to shipping and undesirable replacing of a functioning storage device.

Figure 1A:
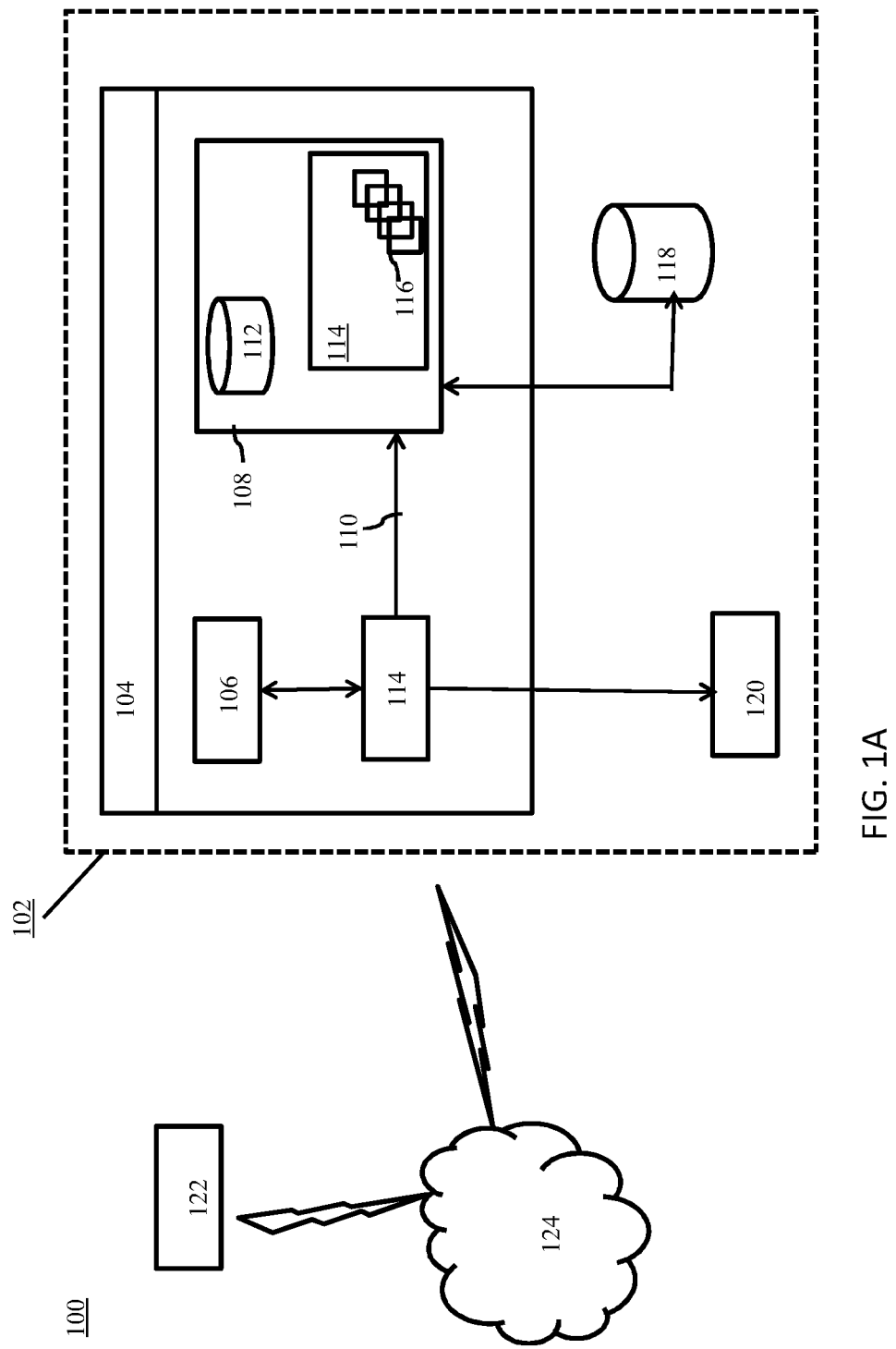
Figure 2:
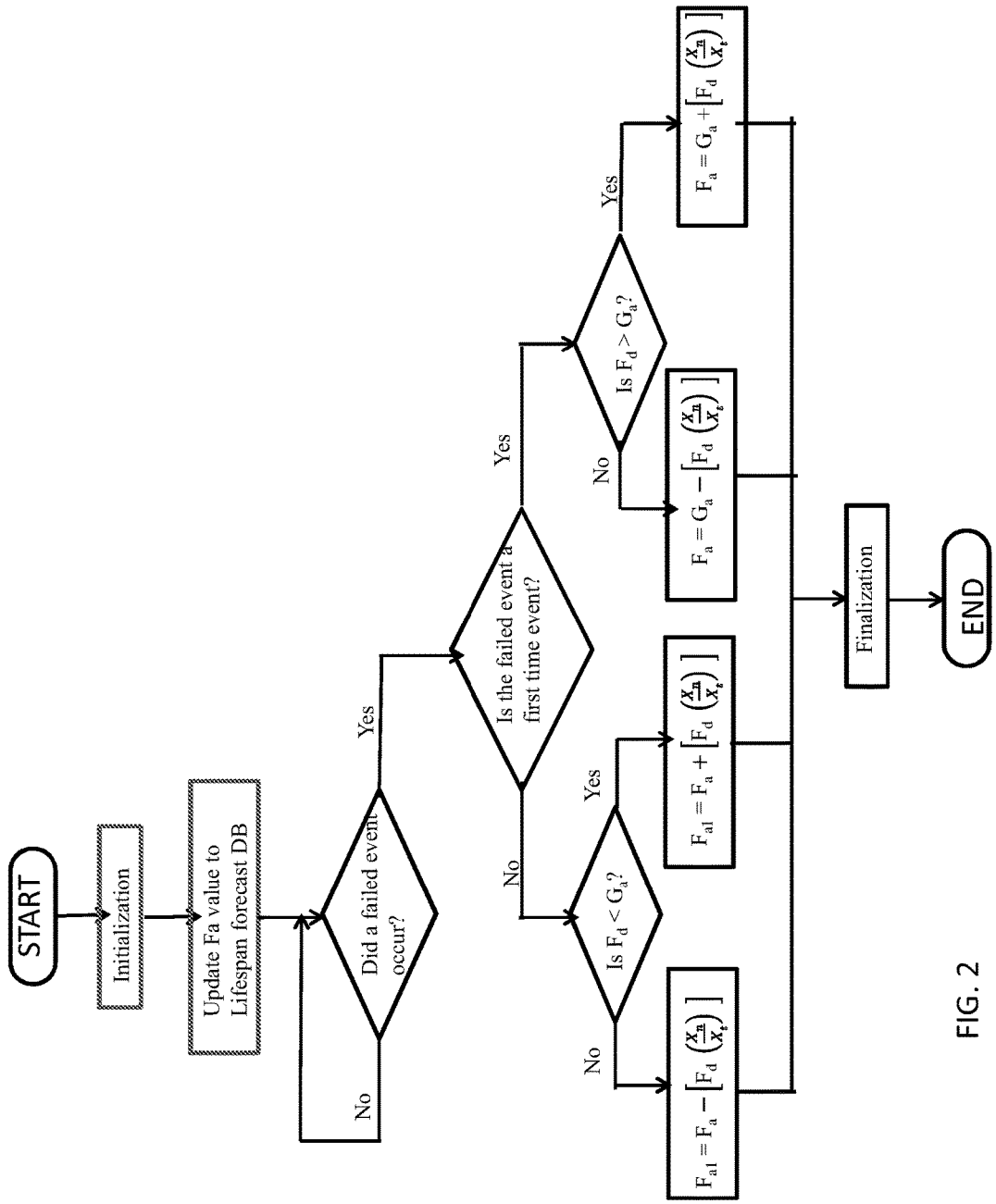
FIG. 2 depicts one embodiment of a flowchart to improve the global lifespan of the storage system using a pre-defined algorithm of the prediction engine, in accordance with an aspect of the present invention.

Referring to FIG. 1A, in one embodiment, is a system 100 for improving a global lifespan of a storage system 112/118 of a computing system 102, in accordance with one or more aspects of the present invention. As depicted in FIG. 1A, computing system 102 is only illustrative of various types of computer infrastructures for implementing the invention. For example, in one embodiment, computing system is only representative of various possible computer systems that can include numerous combinations of hardware. As one skilled in the art will understand, computing system 102 can include any specific purpose computing article of manufacture including hardware and/or computer program code for performing specific functions, any computing article of manufacture that includes a combination of specific purpose and general purpose hardware/software, and the like. In each case, the program code and hardware can be created using standard programming and engineering techniques, respectively.

By way of example, and as depicted in FIG. 1A, computing system 102 may include a data processing system 104 which, in one embodiment, is suitable for storing and/or executing program code, such as, program code for performing processes described herein, and includes one or more processor(s) 106 coupled directly or indirectly to a memory 108 through, one or more buses or other connections 110. As understood, in operation, processor 106 obtains from memory 108 one or more instructions for execution by the processor. Memory 108 may include local memory (not shown) employed during actual execution of the program code, storage system, and cache memories which provide temporary storage of at least some program code in order to reduce the number of times code must be retrieved from storage system during program code execution. By way of example, the storage system 112 of data processing system 104 may include, for instance, removable/non-removable, volatile/non-volatile storage system having one or more storage devices. A non-limiting list of examples of memory 108 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that, in one embodiment, the method and the system disclosed herein may be implemented to improve lifespans of each of the storage devices of the storage system 112 of the memory 108.

Additionally, memory 108 includes a program 114 having a set (at least one) of program modules 116, by way of example, and not limitation, as well as operating system, one or more application programs, other program modules, and program data. Each of the operating system, one or more application programs, other program modules, and program data or some combination thereof, may include an implementation of a networking environment. By way of example, program modules 116 may typically carry out the functions and/or methodologies of embodiments of the invention described herein. In one example, processor 106 executes program 114, such as, prediction engine which is stored in memory 108 with a set of modules 116. As further described below in detail, the prediction engine (not shown) may also be stored at a computer node, such as a server 122 that is in communication with the computing system 102. In one embodiment, the prediction engine (not shown) is a program that is configured with a pre-defined algorithm which, for instance, facilitates improving a lifespan of the storage system disclosed herein, by predicting future failure events of the storage device(s) based on the statistical modeling of the past failure events, thereby defining an optimized lifespan of (for instance, each of the storage device(s)) of the storage system 112. As understood, the processor 106 can read and/or write data from the prediction engine (not shown) of the memory 108.

Further, data processing system 104 may also be coupled with storage system 118 that, for instance, provide sufficient storage for storing programs and data, and may include one or more storage devices, such as, an internal storage device or an attached or network accessible storage. In one example, storage system 118 may include one or more storage devices, such as, for instance, a magnetic disk drive or an optical disk drive. In another example, the storage system 118 may also include storage media, such as, floppy drives, ZIP drives, and other disk drives and the like. As understood, computer programs in storage system 118 may be loaded into memory 108 and executed by the processor 106. Note that, in one embodiment, the method and the system disclosed herein may also be implemented to improve lifespans of (for instance, each of the storage device(s)) of the storage system 118.

Additionally, data processing system 104 may be coupled with one or more external devices 120 either directly or through device interfaces 114, such as, graphical user interfaces 122b (see FIG. 1B). By way of example, the external devices 120 include, but are not limited to, keyboards, pointing devices, displays, and the like. Additionally, although not depicted, network adapters (not shown) may also be coupled to the system to enable the data processing system to become coupled to other data processing systems through intervening private or public networks. Modems, cable modem, and Ethernet cards are just a few of the currently available types of network adapters (not shown).

In one embodiment, and as described above, the computing system 102 associated with a user is in communication with a remote server 122 (FIG. 1A) via wired or wireless network 124 (FIG. 1A). Note that, in one embodiment, FIG. 1B depicts various components of the system that are either located on the computing system 102, or connected directly or indirectly with the computing system 102, and, for instance, can be preferentially used to implement functions and/or methodologies of embodiments of the invention. By way of example, the server 122 can, in one embodiment, run a Dynamic Host Configuration Protocol (DHCP) server component which, in one example, can dynamically assign IP addresses to a dedicated server that would be hosting the prediction engine (not shown) so as to enable storage administrators to easily access the desired information over the web. In such an example, the prediction engine (not shown) may be hosted on a user-specific network component 122a of server 122. As one skilled in the art will understand, DHCP server is a protocol used to communicate between servers and compute node during the initial boot of the compute node. DHCP server defines the protocol by which the server 122 supplies networking and startup information to the node, such as its IP address and getaway, and provides an initial bringup kernel to the node. Note that, as described above, in another embodiment, the prediction engine may also be stored in memory 108 of the data processing system 104 with a set of modules 116.

According to an embodiment, the prediction engine (not shown) may be performed in a statistical programming environment, such as, "Statistical Package for the Social Sciences" (SPSS®) component 122e of the server 122. As understood, SPSS® is web-based software for performing data mining and statistical analysis which, for instance, may be configured to work with other components, as well as perform predictive analysis using the pre-defined algorithm of the prediction engine (not shown). As described above, the prediction engine is software that has been configured with a pre-defined algorithm to calculate a lifespan of the storage system disclosed herein.

The prediction engine (not shown), in accordance with the present invention, is configured to be initiated when a user installs one or more storage device(s) of the storage system 112/118. By way of example, an installation time of the storage device(s) of the storage system 112/118, for instance, defines an installation time of the prediction engine (not shown) in predictive maintenance and reporting solution (SPSS®) component 122d (see FIG. 1B) of server 122. Further, upon initiation, the prediction engine (not shown) will assume a global lifespan of the storage system 112/118, for instance, by ascertaining a lifespan value of each storage device of the storage system 112/118, based on the benchmark values and technical specifications provided by a vendor, the time and/or day of installation of each of the storage devices and the number of the storage device(s) installed, respectively. Further, the global lifespan of the storage system 112/118, for instance, may be calculated by aggregating the lifespan values of each of the storage device(s) of the storage system 112/118, and simply averaging the aggregated lifespan values of the installed storage device(s). As used herein, "lifespan value" refers to a length of time, for which a storage device is assumed to function, depending on the day and/or time of installation of the storage device, as a baseline. Further, the SPSS® component 122d of the server 122, assigns the aggregated and averaged lifespan values of the installed storage device(s) to the prediction engine (not shown) as a global lifespan value of the storage system 112/118, which, in one example, as a baseline for future reference.

By way of example, and in one embodiment, a storage device of the storage system 112/118 is replaced, for instance, when a storage device of the storage system 112/118 malfunctions or is identified as not operating correctly, i.e., a failure event of the storage device occurs. As used herein, "time-based failure event" refers to a failure event of the storage device that is measured starting from the day/time of installation of the storage device to a time the storage device fails. Upon replacing the failed storage device of the storage system 112/118, the SPSS® component 122d of the server 122 is configured, in accordance with the present invention, to modify the global lifespan value of the storage system 112/118 so as to provide a custom-global lifespan value ($F_a$) of the storage system 112/118 having the replaced storage device. For example, the custom-global lifespan value ($F_a$) of the storage system 112/118 having the replaced storage device is calculated using the pre-defined algorithm of the prediction engine (not shown):

$$F_a = G_a \pm \left\lfloor F_d\left(\frac{X_n}{X_t}\right)\right\rfloor$$

where $G_a$ is the global lifespan value of the storage system 112/118, $F_d$ is days between the installation time and the failure event of the storage device, $X_n$ is a number of the storage device(s) during the failure event, and $X_t$ is the total amount of the storage device(s) of the storage system 112/116, and the "±" being dependent on the days between the installation time and the failure event, and the global lifespan value of the storage system.

By way of example, and in one embodiment, if the days between the installation time and the failure event ($F_d$) of the storage device were to exceed the global lifespan value, (i.e., if the storage device were to function beyond its global lifespan value), before a failure event occurs, then the custom-global lifespan value ($F_a$) of the storage system 112/118 having the replaced storage device may be calculated using the pre-defined algorithm $$F_a = G_a + \left\lfloor F_d\left(\frac{X_n}{X_t}\right)\right\rfloor.$$

In another example, if the storage device were to fail prior to its global lifespan value, i.e., if the days between the installation time and the failure event ($F_d$) of the storage device were to be less than its global lifespan value, then the custom-global lifespan value ($F_a$) of the storage system 112/118 having the replaced storage device may be calculated using the pre-defined algorithm $$F_a = G_a - \left\lfloor F_d\left(\frac{X_n}{X_t}\right)\right\rfloor.$$

In another embodiment, when a replaced storage device of the storage system 112/118 malfunctions or fails, in an additional time-based failure event, the failed storage device may be replaced with yet another storage device. In such an example, the SPSS® component 122d of the server 122 is configured to modify the global lifespan value of the storage system 112/118 so as to provide an additional custom-global lifespan value ($F_{a1}$) of the storage system having the additional replaced storage device. In such a case, the additional custom-global lifespan value ($F_{a1}$) of the storage system having the additional replaced storage device is calculated using the pre-defined algorithm $$F_{a1} = F_a \pm \left\lfloor F_d\left(\frac{X_n}{X_t}\right)\right\rfloor$$

where Fa is the custom-global lifespan value ($F_a$) of the storage system 112/118 having the replaced storage device, $F_d$ is days between the installation time and the failure event of the storage device, $X_n$ is a number of the storage device(s) during the failure event, and $X_t$ is the total amount of the storage device(s) of the storage system 112/116.

By way of example, and in one embodiment, if the days between the installation time and the failure event ($F_d$) of the storage device were to exceed the custom-global lifespan value ($F_a$), i.e., if the storage device were to function beyond its custom-global lifespan value ($F_a$), before a failure event occurs, then the additional custom-global lifespan value ($F_{a1}$) of the storage system 112/118 having the replaced storage device may be calculated using the pre-defined algorithm $$F_{a1} = F_a + \left\lfloor F_d\left(\frac{X_n}{X_t}\right)\right\rfloor.$$

In another example, if the storage device were to fail prior to its custom-global lifespan value ($F_a$), i.e., if the days between the installation time and the failure event ($F_d$) of the storage device were to be less than its global lifespan value, then the additional custom-global lifespan value ($F_{a1}$) of the storage system 112/118 having the replaced storage device may be calculated using the pre-defined algorithm $$F_{a1} = F_a - \left\lfloor F_d\left(\frac{X_n}{X_t}\right)\right\rfloor.$$

Additionally, in an enhanced embodiment, each of the global lifespan value, the custom-global lifespan value ($F_a$) and the additional custom-global lifespan value ($F_{a1}$) extracted from the SPSS® component 122d of the server 122, may be stored discretely, for instance, at a lifespan database, in the database component 122c of the server 122. As understood, this lifespan database stored at database component 122c may, in one example, function as a repository for all the information extracted from the SPSS® component 122e of the server 122 and the storage system 112/118, respectively. Further, in one embodiment, the lifespan database may be configured to be updated continuously, for instance, by dynamically monitoring each of storage device, the replaced storage device and the additional replaced storage device of the storage system 112/118. Note that, in one embodiment, each of these storage devices are monitored discretely so as to update the lifespan database discretely by, for instance, integrating the data processing system 104 (see FIG. 1A) with an IT product architecture, such as, for instance, IBM Tivoli Netcool/Impact™ (NCI). As understood, Netcool 122d is a set of runnable server components that work together to provide event management and integration functionality for business service management. For instance, each of these storage device(s) (for instance, including the replaced storage device and the additional replaced storage device) are monitored from their corresponding installation day/time to their failure events, respectively, and their information is discretely updated. This, in turn, can facilitate predicting any impeding/future failure event of the storage device(s), based on the statistical modeling of the past failure events of the storage device(s). As one skilled in the art will understand, the discrete dynamically monitoring of each of the storage device, the replaced storage device and the additional replaced storage device, and replacing the failed storage device(s) provide serialized and parallelized processing steps to predict any future failure events, thereby defining an optimized global lifespan of the storage system 112/118. Note that, in one embodiment, the user can communicate with an administrator and/or technician remotely to provide the information regarding the optimized lifespan of the storage system 112/118, using, for instance, a simple network management protocol (SNMP). As one skilled in the art will understand, simple network management protocol (SNMP) is a common protocol used for managing network infrastructure over the network 124. Alternatively, the administrator and/or technician may access the information remotely from the lifespan database located in the database component 122c of the server 122, using, for instance, the SNMP protocol.

According to one embodiment, an impeding/future failure event of the remaining storage devices of the storage system 112/118, for instance, subsequent to the replaced storage device(s), may be predicted based on the statistical modeling of the failure event of the initially installed storage device. This, for instance, may be accomplished by extracting the custom-global lifespan value ($F_a$) (which, for instance, is an accumulative value) stored in the lifespan database at the database component 122c of the server 122, and subtracting the custom-global lifespan value ($F_a$) from the global lifespan value ($G_a$), thereby predicting an impeding failure of the remaining initially installed storage devices. Advantageously, this, for instance, results in each past failure event predicting an impeding failure event by, for instance, recalculating the global lifespan values of the storage system, not based on the actual benchmark or technical specifications provided by the vendor, but instead be calculated as an average for the environment on which it is deployed. Similarly, an impeding failure of the remaining replaced storage device of the storage system 112/118, in the case of an additional replaced storage device(s) may be predicted, by substituting the value of custom-global lifespan value ($F_a$) for global lifespan value ($G_a$), i.e., subtracting the additional custom-global lifespan value ($F_{a1}$) from the custom-global lifespan value ($F_a$).

In an enhanced embodiment, computing system 102 associated with the user may be coupled with one or more interfaces, such as, a graphical user interface (GUI) component 122b, which, for instance, facilitates human/computer interactions, for visualizing reports, (for example, such as, day/time of installation of the storage system, media manufacturer, system device, information regarding the lifespan values, etc.), alerts (e.g., failure events, impeding failure events, etc.), as well as allowing to access the lifespan database for any required information. Additionally, the GUI 122b also allows communication with other computers or storage area networks (SAN) and the like.

Figure 3:
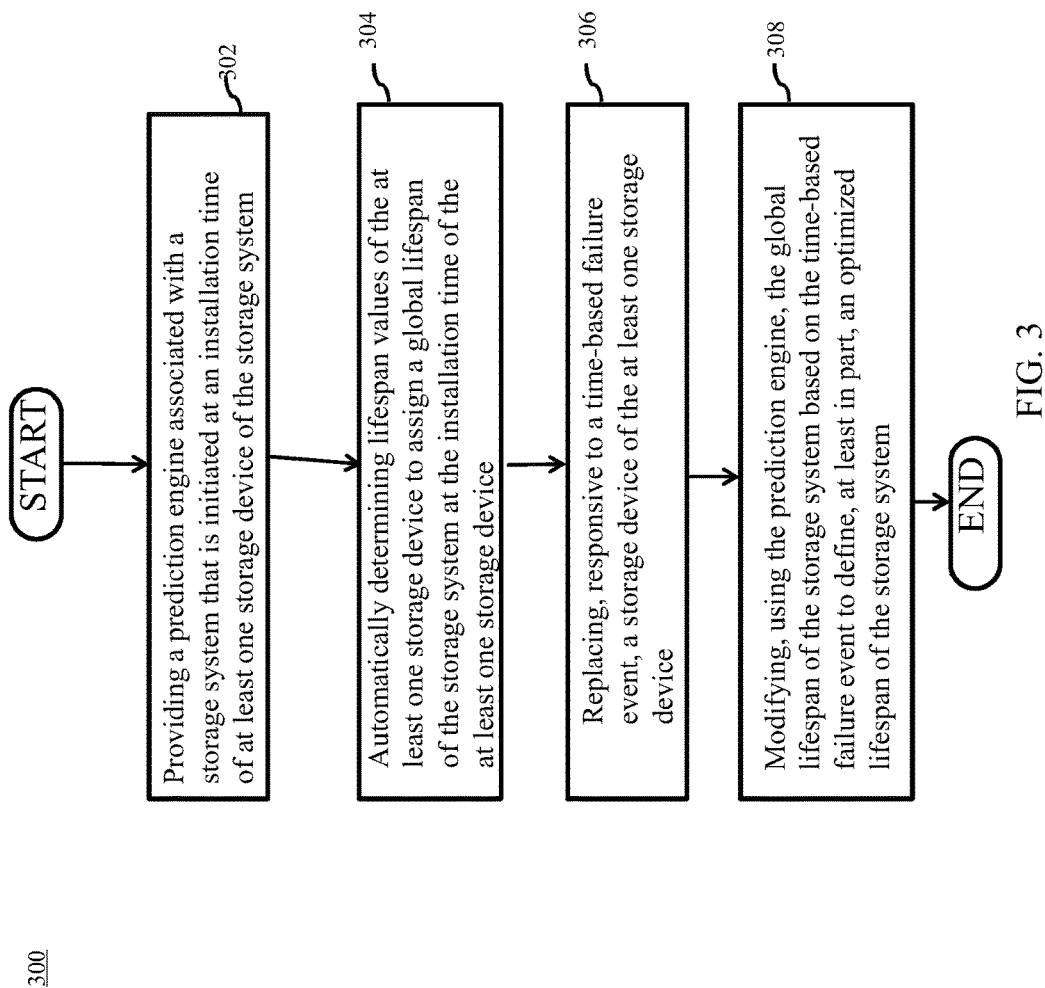
FIG. 3 depicts one embodiment of a process for improving the global lifespan of the storage system of the computing system, in accordance with an aspect of the present invention.

FIG. 3 is an overview of process 300 for providing an optimized global lifespan of a storage system by predicting future failure events of the storage device(s) thereof, based on statistical modeling of the past failure events of the storage devices, in accordance with an aspect of the present invention. The process 300 begins with providing 302 a prediction engine associated with a storage system that is initiated at an installation time of at least one storage device of the storage system, and lifespan values of the at least one storage device may be automatically determined 304 to assign a global lifespan that is dependent on the installation time of the storage system. Further, the process 300 proceeds to replace 306 a storage device of the at least one storage device, in response to a time-based failure event, and the global lifespan of the storage system is modified 308, using the prediction engine, and based on the time-based failure event, to define, at least in part, an optimized lifespan of the storage system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for improving a global lifespan of a storage system of a computing system comprising at least one storage device, the method comprising the steps of: automatically determining a lifespan value of the at least one storage device to assign a global lifespan of the storage system, the global lifespan being dependent on the installation time of the at least one storage device; replacing, responsive to a time-based failure event, a storage device of the at least one storage device; and subsequently modifying, using the computing system, the global lifespan of the storage system based on the time-based failure event to define, at least in part, an optimized lifespan of the storage system.

2. The method of claim 1, further comprising a prediction engine, wherein the prediction engine is configured with a pre-defined algorithm, and the automatically determining comprises determining lifespan values of each storage device of the at least one storage device from the installation time thereof, and averaging the lifespan values of each storage device to obtain a global lifespan value of the at least one storage device, the global lifespan value being assigned to the pre-defined algorithm of the prediction engine to define the global lifespan of the storage system.

3. The method of claim 2, wherein the replacing of the storage device of the at least one storage device provides a custom-global lifespan value of the storage system comprising a replaced storage device, the custom-global lifespan value being calculated using the pre-defined algorithm of the prediction engine.

4. The method of claim 3, wherein the custom-global lifespan value ($F_a$) of the storage system is calculated using the pre-defined algorithm:

$$F_a = G_a \pm \left\lfloor F_d\left(\frac{X_n}{X_t}\right)\right\rfloor$$

wherein $G_a$ is the global lifespan value of the storage system, $F_d$ is days between the installation time and the failure event, $X_n$ is a number of the at least one storage device failed during the failure event, and $X_t$ is the total amount of the at least one storage devices of the storage system.

5. The method of claim 3, further comprising an additional time-based failure event, wherein the replacing comprises replacing the replaced storage device of the at least one storage device, responsive to the additional time-based failure event, the replacing of the replaced storage device providing an additional custom-global lifespan value of the at least one storage device comprising an additional replaced storage device.

6. The method of claim 5, wherein the additional custom-global lifespan value ($F_{a1}$) of the storage system is calculated using the pre-defined algorithm:

$$F_{a1} = F_a \pm \left\lfloor F_d\left(\frac{X_n}{X_t}\right)\right\rfloor$$

wherein $F_a$ is the custom-global lifespan value of the storage system, $F_d$ is days between the installation time and the time-based failure event, $X_n$ is a number of the at least one storage device failed during the time-based failure event, and $X_t$ is the total amount of the at least one storage devices of the storage system.

7. The method of claim 5, further comprising storing discretely, at a lifespan database, each of the global lifespan value, the custom-global lifespan value and the additional custom-global lifespan value of the at least one storage device, wherein the lifespan database facilitates predicting an impeding failure event of the storage system using the prediction engine.

8. The method of claim 7, further comprising dynamically monitoring each of the storage device, the replaced storage device and the additional replaced storage device of the at least one storage device discretely to predict the impeding failure event of the storage system.

9. The method of claim 8, wherein the dynamically monitoring of each of the storage device, the replaced storage device and the additional replaced storage device provides serialized and parallelized processing steps to define the optimized lifespan of the storage system.

10. The method of claim 8, further comprising subtracting the custom-global lifespan value from the global lifespan value stored in the lifespan database to predict the impeding failure event of the replaced storage device of the at least one storage device so as to define the optimized lifespan of the storage system.

11. The method of claim 8, further comprising subtracting the additional custom-global lifespan value from the global lifespan value stored in the lifespan database to predict the impeding failure event of the additional replaced storage device of the at least one storage device so as to define the optimized lifespan of the storage system.

12. A computer program product for improving a global lifespan of a storage system comprising at least one storage device, the computer program product comprising a computer readable storage medium having program instructions embodied therewith, the program instructions readable by a processor to cause the processor to perform a method comprising the steps of:
   automatically determining a lifespan value of the at least one storage device to assign a global lifespan of the storage system, the global lifespan being dependent on the installation time of the at least one storage device; and
   modifying, after one or more of the at least one storage devices is replaced following a time-based failure event, the global lifespan of the storage system based on the time-based failure event to define, at least in part, an optimized lifespan of the storage system.

13. The computer program product of claim 12, wherein the replacing of the storage device of the at least one storage device provides a custom-global lifespan value of the at least one storage device comprising a replaced storage device, the custom custom-global lifespan value ($F_a$) of the storage system is calculated using the pre-defined algorithm:

$$F_a = G_a \pm \left\lfloor F_d \left( \frac{X_n}{X_t} \right) \right\rfloor$$

wherein $G_a$ is a global lifespan value of the storage system, $F_d$ is days between the installation time and the failure event, $X_n$ is a number of the at least one storage device failed during the failure event, and $X_t$ is the total amount of the at least one storage devices of the storage system.

14. The computer program product of claim 12, further comprising an additional time-based failure event, wherein the replacing comprises replacing the replaced storage device of the at least one storage device, responsive to the additional time-based failure event, to provide an additional custom-global lifespan value of the at least one storage device comprising an additional replaced storage device.

15. The computer program product of claim 14, wherein the additional custom-global lifespan value ($F_{a1}$) of the storage system is calculated using the pre-defined algorithm:

$$F_{a1} = F_a \pm \left\lfloor F_d \left( \frac{X_n}{X_t} \right) \right\rfloor$$

wherein $F_a$ is the custom-global lifespan value of the storage system, $F_d$ is days between the installation time and the time-based failure event, $X_n$ is a number of the at least one storage device failed during the time-based failure event, and $X_t$ is the total amount of the at least one storage devices of the storage system.

16. A system for improving a global lifespan of a storage system of a computing system, the system comprising:
   at least one storage device; and
   a processor in communication with the at least one storage device, wherein the processor is configured to: (i) automatically determine a lifespan value of the at least one storage device to assign a global lifespan of the storage system, the global lifespan being dependent on the installation time of the at least one storage device; (ii) modifying, after one or more of the at least one storage devices is replaced following a time-based failure event, the global lifespan of the storage system based on the time-based failure event to define, at least in part, an optimized lifespan of the storage system.

17. The system of claim 16, wherein the system is configured to calculate a custom-global lifespan value of the at least one storage device comprising a replaced storage device, upon replacing of the storage device, the custom custom-global lifespan value ($F_a$) of the storage system is calculated using the pre-defined algorithm:

$$F_a = G_a \pm \left\lfloor F_d \left( \frac{X_n}{X_t} \right) \right\rfloor$$

wherein $G_a$ is a global lifespan value of the storage system, $F_d$ is days between the installation time and the failure event, $X_n$ is a number of the at least one storage device failed during the failure event, and $X_t$ is the total amount of the at least one storage devices of the storage system.

18. The system of claim 16, further comprising an additional time-based failure event, wherein the system is further configured to replace the replaced storage device of the at least one storage device, responsive to the additional time-based failure event, and to calculate an additional custom-global lifespan value of the storage system comprising an additional replaced storage device.

19. The system of claim 18, wherein the second custom-global lifespan value ($F_{a1}$) of the storage system is calculated using the pre-defined algorithm:

$$F_{a1} = F_a \pm \left\lfloor F_d \left( \frac{X_n}{X_t} \right) \right\rfloor$$

wherein $F_a$ is the first custom-global lifespan value of the storage system, $F_d$ is days between the installation time and the time-based failure event, $X_n$ is a number of the at least one storage device failed during the time-based failure event, and $X_t$ is the total amount of the at least one storage devices of the storage system.

20. The system of claim 16, further comprising a lifespan database, the lifespan database being configured to store discretely each of the global lifespan value, the custom-global lifespan value and the additional custom-global lifespan value of the at least one storage device, the lifespan database facilitating predicting an impeding failure event of the storage system so as to define the optimized lifespan thereof.

* * * * *